April 23, 1929.  E. HOLLANDER  1,710,540

IRRIGATION CONTROL DEVICE

Filed April 4, 1928

Inventor
Edward Hollander
By his Attorney
Clarence G. Campbell.

Patented Apr. 23, 1929.

1,710,540

UNITED STATES PATENT OFFICE.

EDWARD HOLLANDER, OF NEW YORK, N. Y., ASSIGNOR TO THE KNY-SCHEERER CORPORATION OF AMERICA, OF NEW YORK, N. Y., A CORPORATION OF NEW YORK.

IRRIGATION-CONTROL DEVICE.

Application filed April 4, 1928. Serial No. 267,150.

My invention relates to an improvement in an irrigation control device and the novelty resides in the adaptation and arrangement of parts as will be more fully hereinafter pointed out.

The earlier form of apparatus used in colonic or other irrigation consists of a colon tube joined by means of a T connecting tip with an inflow and an outflow rubber tubing.

Two shut-off clips, one to each tubing, are alternately opened and closed to regulate the flow of fluid to and from the colon. The manipulation of these clips requires the constant service of an attendant as they cannot be manipulated by the person taking the irrigation.

In order to simplify the technique of colon irrigation and eliminate the T connection and the two shut-off clips various types of return flow colon tubes have been constructed. In these the inflow and outflow of fluid occurs through two separate channels in the colon tube. This arrangement, however, has been found to fail frequently since the current in the outflow portion of the tube is always in one direction and fecal particles are frequently clogging the same.

My device solves both of these problems furnishing a control mechanism which is simple and positive and readily accessible to the person taking the irrigation and therefore easily operated by said person without the help of any assistant. Furthermore, the irrigating solution in my device is supplied to the point of irrigation through the same tube through which the irrigation point is drained following the irrigation thereby always insuring the clearing of the tube so as to prevent the clogging of the same.

Furthermore, my device is so arranged that the colon tube is always held in one position as the device is held at the anus, thereby preventing any irritation through any unnecessary movement of the colon tube.

Where a nurse or attendant is not available my irrigation device can be used by the patient where the patient cannot afford the services of an attendant or for reasons of modesty is unwilling to accept the services of an attendant and the advantage of my device will be apparent in a clinic or a ward with limited nursing facilities and where the necessity of many irrigations is so urgent in the treatment of patients.

Figure 1:
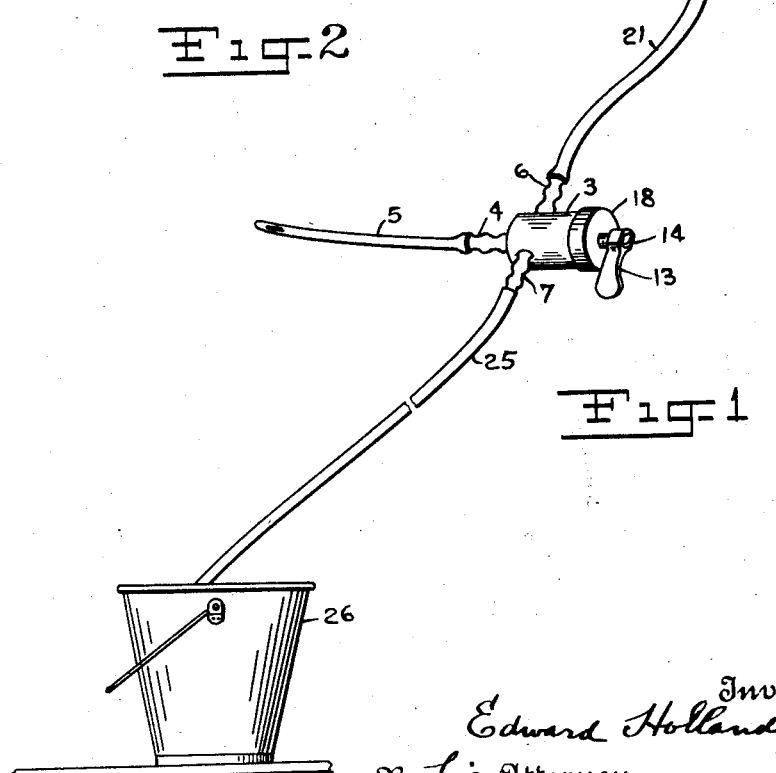

Referring to the drawings Figure 1 is a complete combination of a colonic irrigation outfit in which my control device is used.

Figure 2:
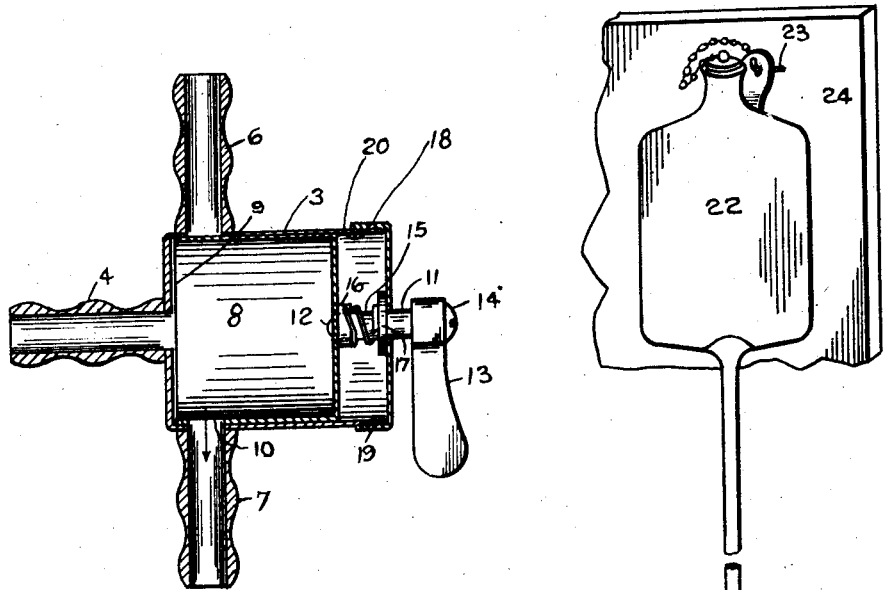

Figure 2 is a vertical section of my control device.

In the drawings 3 is a body portion of my device in which is rigidly mounted at the base an irrigation nipple 4 having an irregular outer surface adapted for holding a colonic irrigation tube 5 or other similar irrigation tube. A nipple 6 similar to 4 is rigidly secured to one side of the body 3 near the base and a third and similar nipple 7 is secured to the opposite side from 6 of the body 3 so that said nipples 4, 6 and 7 all connect to the interior of the body 3. An inverted cup or shuttle valve 8 is adapted to slide into the body 3 with an open end 9 of said cup resting against the bottom of the body 3. Said shuttle valve or mixing chamber 8 has an opening 10 the same size as the openings to nipples 6 and 7 and adapted to register with said openings of 6 and 7 alternately. A handle 11 is rigidly secured at 12 to the upper and closed portion of the shuttle valve 8 having a bar 13 rigidly secured to the handle 11 at 14. A spring 15 is mounted over the handle 11, one end of said spring being secured to the same at 16 and the opposite end of the spring 15 pressing against a washer 17 which is mounted so as to slide on the handle 11. A cover 18 is internally threaded at 19 so as to engage external threadings 20 on the upper exterior edge of the body 3 and said cover 18 is mounted on the handle 11 between the washer 17 and the bar 13. The person to be irrigated can place the colon irrigation tube 5 in place for irrigation, holding my control device in the hand so that it rests gently against the anus.

My control device is adapted to be connected up in an irrigation combination as shown in Figure 1 in which the colon tube 5 is mounted over the nipple 4 and an inlet tube 21 from a container 22, holding the irrigation mixture, is mounted over nipple 6, said container 22 being supported at 23 on wall 24 in the usual manner. An outlet 25 running to a waste container 26 is mounted over outlet nipple 7.

In operating my device when the cover is screwed down into position the pressure of the spring 15 on the shuttle valve and mixing chamber 8 will be such as to insure a water-tight closure of the same in connection with the body 3. The irrigation solution from the container 22 is allowed to enter the shuttle valve or mixing chamber 8 by turning the bar 13 as shown in Figure 2 to the upright position, whereby the shuttle valve 8 through the handle 11 rigidly connected thereto is turned so as to throw the opening 10 into alignment with the opening of nipple 6 and simultaneously closing the opening of nipple 7 whereby the irrigation solution from container 22 runs through the tube 21 and nipple 6 into the opening 10 of the shuttle valve 8, into the shuttle valve 8 which serves also as a mixing chamber. The irrigation solution will then run through the nipple 4 into the colon irrigating tube 5 to the point of irrigation. The irrigation solution will be allowed to so run from the container 22 until the amount desired for irrigation has been received at the point of irrigation when the person being irrigated can by simply turning the bar 13 back to the position shown in Figure 2 throw the opening 10 into alignment with the opening of nipple 7 whereby the opening to the nipple 6 is simultaneously closed and the irrigation solution together with fecal matter will be drained from the point of irrigation to nipple 4 into the mixing chamber 8, thence into the opening 10 into the nipple 7, thence through the outlet 25 into waste container 26.

It is thus seen that the irrigation solution as it returns from the irrigation point mixed with fecal matter passes through tube 5, nipple 4 and into the mixing chamber 8 where it has a chance to mix and become broken up before it passes into and out through the opening 10, nipple 7 and outlet 25. It is also to be noted that if tube 5 and nipple 4 become in any way clogged during this draining operation immediately upon the closing of the opening to nipple 7 and the opening of nipple 6 by turning the opening 10 to alignment with the opening of nipple 6, the fresh mixture of irrigating solution is again permitted to flow from the container 22 through tube 21, nipple 6 into mixing chamber 8 and thence out through the nipple 4 and tube 5, cleaning out any fecal matter or obstructing material which may have clogged the same.

It is thus apparent that the person taking the irrigation may by merely turning the bar 13 from one side to the other side permit the irrigating solution to flow into the irrigating point and by a simple turning back of the bar 13 again permit the irrigating solution and fecal matter to drain off, which operation can be repeated as many times as may be desired without disturbing the position of the colon irrigating tube and the control device of my invention.

My device is equally adapted for use in vaginal irrigation as well as colon irrigation and a rubber plug over a vaginal tube to close the vaginal opening, can be readily substituted for the colon tube in the drawing as shown and the operation will be just the same, the point of irrigation alone being changed.

I claim:

1. In an irrigation control device the combination of a mixing chamber for the outflow, an opening therefrom leading to the point of irrigation, an inlet to said chamber from the source of irrigating solution, an outlet for waste from said chamber and a single valve controlling said inlet and outlet openings.

2. In an irrigation control device the combination of a main body, a nipple connector for irrigating running from the base of said body, a nipple connector for source of irrigating solution on one side of said body, a nipple connector for waste on the other side of said body, an inverted cup member fitting said body so as to rotate freely therein and having an opening adapted to register with the openings of the supply and waste nipples alternately, a handle rigidly secured to said cup member carrying a cover adapted to screw onto said body and a spring on said handle between said cup and cover effecting a downward pressure on said cup when the cover is secured on said body.

3. In an irrigation control device the combination of mixing means for the outflow, means for receiving therein a supply of irrigating solution, means for conducting said irrigating solution to the point to be irrigated and a single control means for cutting off said irrigation supply and draining said irrigation point into and through said mixing chamber to a waste receiver.

4. In an irrigation control device the combination of means for receiving an irrigation solution supply and feeding the same to the point to be irrigated, and a single control means for shutting off said irrigation supply and simultaneously draining said point of irrigation through the feeding means into and through a mixing chamber to a waste receiver.

5. In an irrigating control device the combination in a mixing chamber of means for receiving a supply of irrigating solution and feeding it from said mixing chamber to the point to be irrigated and a single control means for shutting off said irrigating solution and simultaneously draining the same from said irrigating point with fecal matter through said mixing chamber to a waste receiver.

6. In an irrigation control device the combination of a mixing chamber, an opening therefrom leading to the point of irrigation, an inlet to said chamber from the source of irrigating solution, an outlet for waste solution and fecal matter into and through said mixing chamber and a single valve controlling said inlet and outlet openings readily operable by the person taking the irrigation.

7. In an irrigation control device the combination of a main body, a nipple connector for irrigating running from the base of said body, a nipple connector for source of irrigation solution on one side of said body, a nipple connector for waste on the other side of said body, an inverted cup member fitting said body so as to rotate freely therein and having an opening adapted to register with the openings of the supply and waste nipples alternately, a handle rigidly secured to said cup member carrying a cover adapted to screw onto said body and a spring on said handle between said cup and cover effecting a downward pressure on said cup when the cover is secured on said body, said handle being readily and accessibly operable by the person taking the irrigation.

8. In an irrigation control device the combination of mixing means, means for receiving therein a supply of irrigating solution, means for conducting said irrigating solution to the point to be irrigated and a single control means for cutting off said irrigation supply and draining said irrigation point through said feeding means into and through said mixing chamber to a waste receiver, said single control means being accessible to and readily operable by the person taking the irrigation.

9. In an irrigation control device the combination of means for receiving an irrigation solution supply and feeding the same to the point to be irrigated, and a single control means for shutting off said irrigation supply and simultaneously draining said point of irrigation into and through a mixing means to a waste receiver, said single control means being accessible to and readily operable by the person taking the irrigation.

10. In an irrigating control device the combination in a mixing chamber of means for receiving a supply of irrigating solution and feeding it from said mixing chamber to the point to be irrigated and a single control means for shutting off said irrigating solution and simultaneously draining the same from said irrigating point into and through said mixing chamber to a waste receiver, said single control means being accessible to and readily operable by the person taking the irrigation.

In testimony whereof I affix my signature.

EDWARD HOLLANDER.